US012738105B1

(12) United States Patent
Valenta et al.

(10) Patent No.: US 12,738,105 B1
(45) Date of Patent: Sep. 15, 2026

(54) MANAGING VEHICLE DIAGNOSTIC DATA USING FILTERING AND INTERPOLATION METHODS

(71) Applicant: Samsara Inc., San Francisco, CA (US)

(72) Inventors: Stephen Valenta, Brooklyn, NY (US); Lucas Wonderley, Decatur, GA (US); Evan Smoot, Atlanta, GA (US); Michael Womack, Sandy Springs, GA (US); Gregory Wood, Acworth, GA (US); Shaurye Aggarwal, New Delhi (IN); Andrew Robbins, San Francisco, CA (US); Timothy John Passaro, Vancouver, WA (US); Glen Phillip McGillan, San Francisco, CA (US); Andrew Middleton, Atlanta, GA (US)

(73) Assignee: Samsara Inc., San Francisco, CA (US)

( * ) Notice: Subject to any disclaimer, the term of this patent is extended or adjusted under 35 U.S.C. 154(b) by 582 days.

(21) Appl. No.: 17/820,855

(22) Filed: Aug. 18, 2022

Related U.S. Application Data

(60) Provisional application No. 63/366,120, filed on Jun. 9, 2022.

(51) Int. Cl.
*G07C 5/00* (2006.01)
*G07C 5/08* (2006.01)

(52) U.S. Cl.
CPC ........... *G07C 5/0808* (2013.01); *G07C 5/008* (2013.01); *G07C 5/0841* (2013.01)

(58) Field of Classification Search
CPC ..... G07C 5/0808; G07C 5/008; G07C 5/0841
USPC ........................................................ 701/31.4
See application file for complete search history.

(56) References Cited

U.S. PATENT DOCUMENTS 9,679,487 B1 * 6/2017 Hayward ............... G01C 21/34
2009/0171684 A1 * 7/2009 Samolinski ............ G06Q 10/10 705/305
2012/0259547 A1 * 10/2012 Morlock ............ G01C 21/3819 701/400
2020/0150234 A1 * 5/2020 Miki ....................... G01S 17/87
(Continued)

FOREIGN PATENT DOCUMENTS

DE 102018202272 A1 * 8/2019

OTHER PUBLICATIONS

"Compliance Product Brief", Motive Technologies Inc. (2022), 4 pgs.
(Continued)

*Primary Examiner* — Erin M Piateski
*Assistant Examiner* — Michael T Dowling
(74) *Attorney, Agent, or Firm* — Schwegman Lundberg & Woessner, P.A.

(57) ABSTRACT

Various embodiments include systems, methods, and non-transitory computer-readable media for managing vehicle diagnostic data. Consistent with these embodiments, a method includes detecting a lack of Engine Control Unit (ECU) data reported by a vehicle in a time period, identifying distance data reported by the vehicle in the time period, determining that the vehicle traveled at a speed higher than a threshold speed in the time period, using a filtering algorithm to generate a spotty data point based on the distance data, and excluding the distance data that overlaps with the spotty data point from diagnostic data associated with the vehicle.

20 Claims, 6 Drawing Sheets

(56) References Cited

U.S. PATENT DOCUMENTS

| | | | | |
|---|---|---|---|---|
| 2020/0200265 | A1* | 6/2020 | Anderson | F16H 59/74 |
| 2020/0254929 | A1* | 8/2020 | van den Berghe | B66F 17/003 |

OTHER PUBLICATIONS

"Dispatch Product Brief", Motive Technologies, Inc., (2022), 4 pgs.
"Driver Safety Product Brief", Motive Technologies Inc, (2022), 4 pgs.
"Product Brief Tracking and Telematics", Motive Technologies Inc, (2022), 4 pgs.
"Smart Event Thresholds Guide", Motive Technologies Inc, (2022), 11 pgs.

* cited by examiner

MANAGING VEHICLE DIAGNOSTIC DATA USING FILTERING AND INTERPOLATION METHODS

PRIORITY APPLICATION

This application claims priority to U.S. Provisional Patent Application Ser. No. 63/366,120, filed Jun. 9, 2022, the disclosure of which is incorporated by reference herein in its entirety.

TECHNICAL FIELD

Embodiments of the present disclosure generally relate to the field of fleet operation management systems for supporting operations of fleet vehicles and, more particularly, but not by way of limitation, to a system to manage vehicle diagnostic data using filtering and interpolation methods.

BACKGROUND

In existing systems, miscalculation of fuel efficiency may occur due to inconsistent diagnostic data reported by a vehicle. For example, fuel consumption may be underreported due to Engine Control Unit (ECU) data reporting issues, including noncontinuous (e.g., spotty) ECU data reporting issues caused by intermittent ECU data dropout. Under-reported fuel consumption may cause a miscalculation of gas mileage, an important indicator that supports various business decisions. Therefore, improvements are needed.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
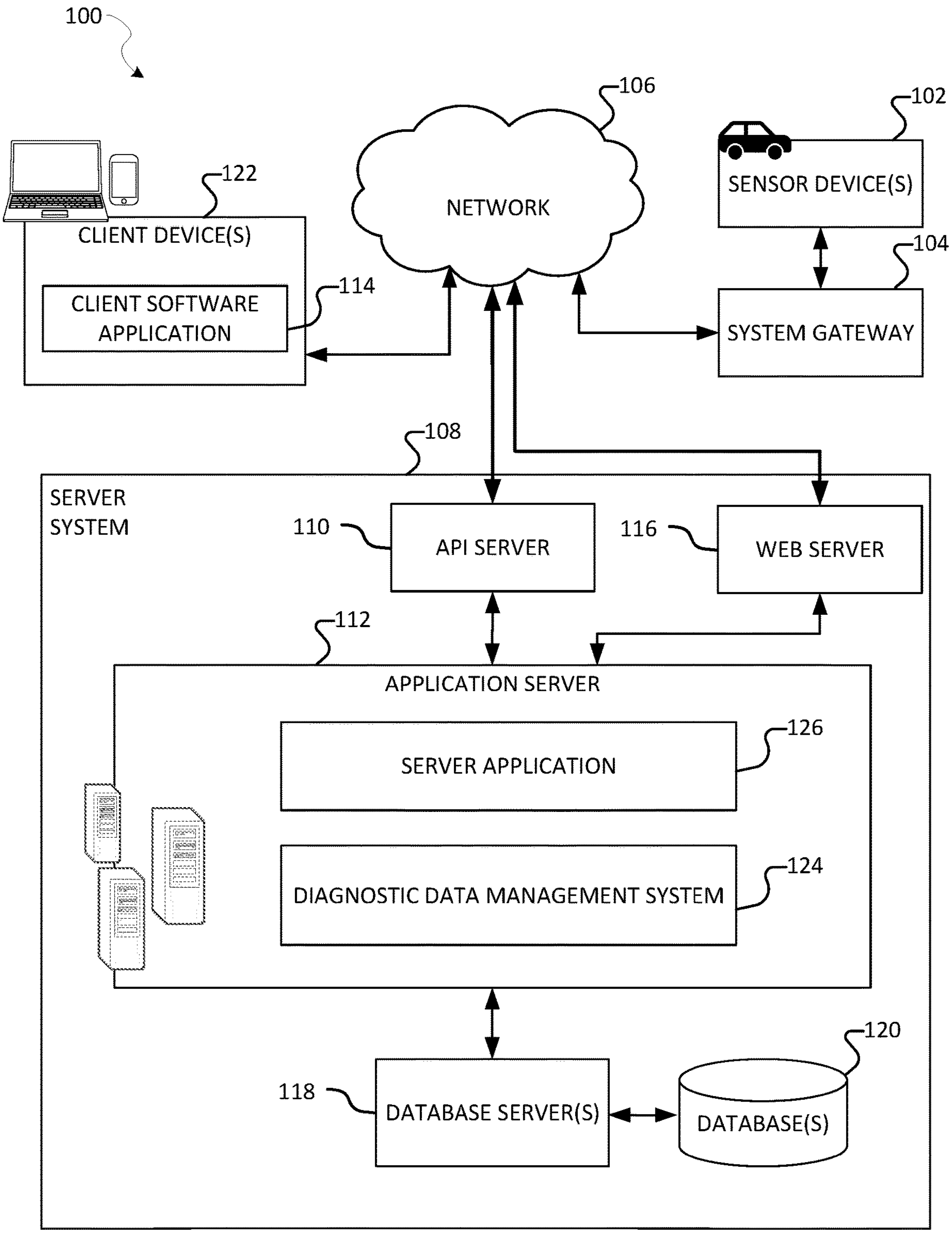
FIG. 1 is a block diagram showing an example networked environment that includes a diagnostic data management system, according to various embodiments of the present disclosure.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter may be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various embodiments may be given throughout this description. These are merely descriptions of specific embodiments. The scope or meaning of the claims is not limited to the embodiments given.

Existing fleet operation management systems may miscalculate fuel efficiency due to various issues, including noncontinuous (e.g., spotty) ECU data reporting issues caused by intermittent erroneous ECU data dropout. Spotty ECU data, represented by spotty data points or spotty data segments as described herein, refers to ECU data reported by a vehicle as a result of one or more instances of ECU data dropout within a predefined time period. Each erroneous ECU data dropout may indicate an ECU data underreporting instance where distance data is continuously reported when no ECU data is reported. Erroneous ECU data dropout may also be referred to as ECU data dropout for purposes of discussions herein. The distance data associated with underreported ECU data may cause the miscalculation of a Miles Per Gallon (MPG) value, causing it to be higher than the actual value. ECU data dropout or diagnostics dropout may be caused by various software issues, including memory and/or CPU overload, or hardware issues associated with the vehicle.

Various examples include systems, methods, and non-transitory computer-readable media for managing vehicle diagnostic data using filtering and interpolation methods. Specifically, a diagnostic data management system detects a lack of ECU data reported by a vehicle in a time period. The diagnostic data management system identifies distance data reported by the vehicle in the time period. Distance data may be reported via an odometer, or a Global Positioning System (GPS) device communicatively coupled to the vehicle. The diagnostic data management system determines that the vehicle traveled in the time period at speed higher than a threshold speed (e.g., 5 mph or 15 mph). The vehicle speed may be calculated based on the distance data.

In various embodiments, the diagnostic data management system uses a filtering algorithm to generate a spotty data point based on the distance data. The filtering algorithm may be a percentage-based algorithm or a proximity-based algorithm. The diagnostic data management system excludes (or filters out) data associated with the spotty data point from the diagnostic data of the vehicle. The data associated with (or overlaps with) the spotty data point may include the identified distance data and the associated ECU data (if any) in the same dropout time period. Diagnostic data may be used for various downstream analysis and operations, including fuel efficiency indicator calculations. Gas mileage is an example fuel efficiency indicator. Gas mileage may be measured in MPG. An MPG value indicates a degree of fuel efficiency. For example, an MPG value of 15 mpg indicates a vehicle travels 15 miles per gallon of gas.

In various embodiments, the diagnostic data management system uses the filtering algorithm to generate a plurality of spotty data points associated with the vehicle. The plurality of spotty data points comprises successive data points within a specified time period, such as 10 minutes. A spotty data point represents an instance of ECU data dropout. The diagnostic data management system may generate one or more spotty data segments based on the plurality of spotty data points. The generation of a spotty data segment may be based on one or more conditions. An example condition may be the percentage of spotty data points included in each spotty data segment is above a threshold percentage (e.g., 70% or 75%). Another example condition may be some additional ECU data being reported within the same day as the detected ECU data dropout. Each spotty data segment corresponds to a predetermined time interval (e.g., 2 minutes, 5 minutes, 10 minutes or 15 minutes).

In various embodiments, the diagnostic data management system may exclude, or filter out, distance data and the associated ECU data that overlap with the one or more spotty data segments from the diagnostic data of the vehicle.

In various embodiments, the diagnostic data management system may interpolate ECU data to fill in the missing ECU data with estimated data for the periods of ECU data dropout. Interpolation is the process of using known data values to estimate unknown data values. For example, the diagnostic data management system may generate estimated ECU data based on historical fuel consumption data associated with the vehicle and associate the estimated ECU data with the diagnostic data. The estimated ECU data may be generated further based on vehicle identification data and the distance data reported by the vehicle in the time period. Vehicle identification data may include the make, model, year, engine type, fuel type, vehicle weight, road type, speed, acceleration rates, and other relevant factors of the vehicle. Further, the estimated ECU data may be generated based on similar vehicles that share similar identification data, as described herein.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example networked environment 100 that includes a diagnostic data management system, according to various embodiments of the present disclosure. The example networked environment 100 includes one or more client devices 122 that host a number of applications, including a client application 114.

Accordingly, each client application 114 is able to communicate and exchange data with another client application 114 and with the server application 126 executed at the server system 108 via the network 106. The data exchanged between client applications 114, and between a client application 114 and the server system 108, includes functions (e.g., commands to invoke functions) as well as payload data (e.g., text, audio, video or other multimedia data).

The server system 108 provides server-side functionality via the network 106 to a particular client application 114, and in some embodiments to the sensor device(s) 102 and the system gateway 104. While certain functions of the networked environment 100 are described herein as being performed by either a client application 114, the sensor device(s) 102, the system gateway 104, or by the server system 108, it will be appreciated that the location of certain functionality either within the client application 114 or the server system 108 is a design choice. For example, it may be technically preferable to initially deploy certain technology and functionality within the server system 108, but to later migrate this technology and functionality to the client application 114, or one or more processors of the sensor device(s) 102, or system gateway 104, where there may be sufficient processing capacity.

The server system 108 supports various services and operations that are provided to the client application 114. Such operations include transmitting data to, receiving data from, and processing data generated by the client application 114, the sensor devices 102, and the system gateway 104. In some embodiments, the sensor devices 102 may include an odometer associated with a vehicle, as well as a GPS associated with the vehicle. In some embodiments, this data includes, message content, device information, geolocation information, persistence conditions, social network information, sensor data, and live event information, as examples. In other embodiments, other data is used. Data exchanges within the networked environment 100 are invoked and controlled through functions available via graphical user interfaces (GUIs) of the client application 114.

With respect to the server system 108, each of an Application Program Interface (API) server 110 and a web server 116 is coupled to an application server 112, which hosts the diagnostic data management system 124. The application server 112 is communicatively coupled to a database server 118, which facilitates access to a database 120 that stores data associated with the application server 112, including data that may be generated or used by the diagnostic data management system 124.

The API server 110 receives and transmits data (e.g., sensor data, API calls, commands, requests, responses, and payloads) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, the sending of sensor data (e.g., images, video, geolocation data, inertial data, temperature data, etc.) from a client application 114 to the server application 126, and for possible access by another client application 114, the setting of a collection of data, the retrieval of such collections, the retrieval of data, and the location of devices within a region.

The application server 112 hosts a number of applications and subsystems, including a server application 126, and the diagnostic data management system 124. The diagnostic data management system 124 is configured to access distance data, ECU data, and historical vehicle diagnostic data from a repository (e.g., the databases 120) and automatically perform various operations as described herein.

The server application 126 implements a number of data processing technologies and functions, particularly related to the aggregation and other processing of data (e.g., sensor data generated by the sensor devices 102). Other processor and memory intensive processing of data may also be performed server-side by the server application 126, in view of the hardware requirements for such processing.

The application server 112 is communicatively coupled to a database server 118, which facilitates access to a database 120 in which data is stored and performs various operations by the server application 126.

Figure 2:
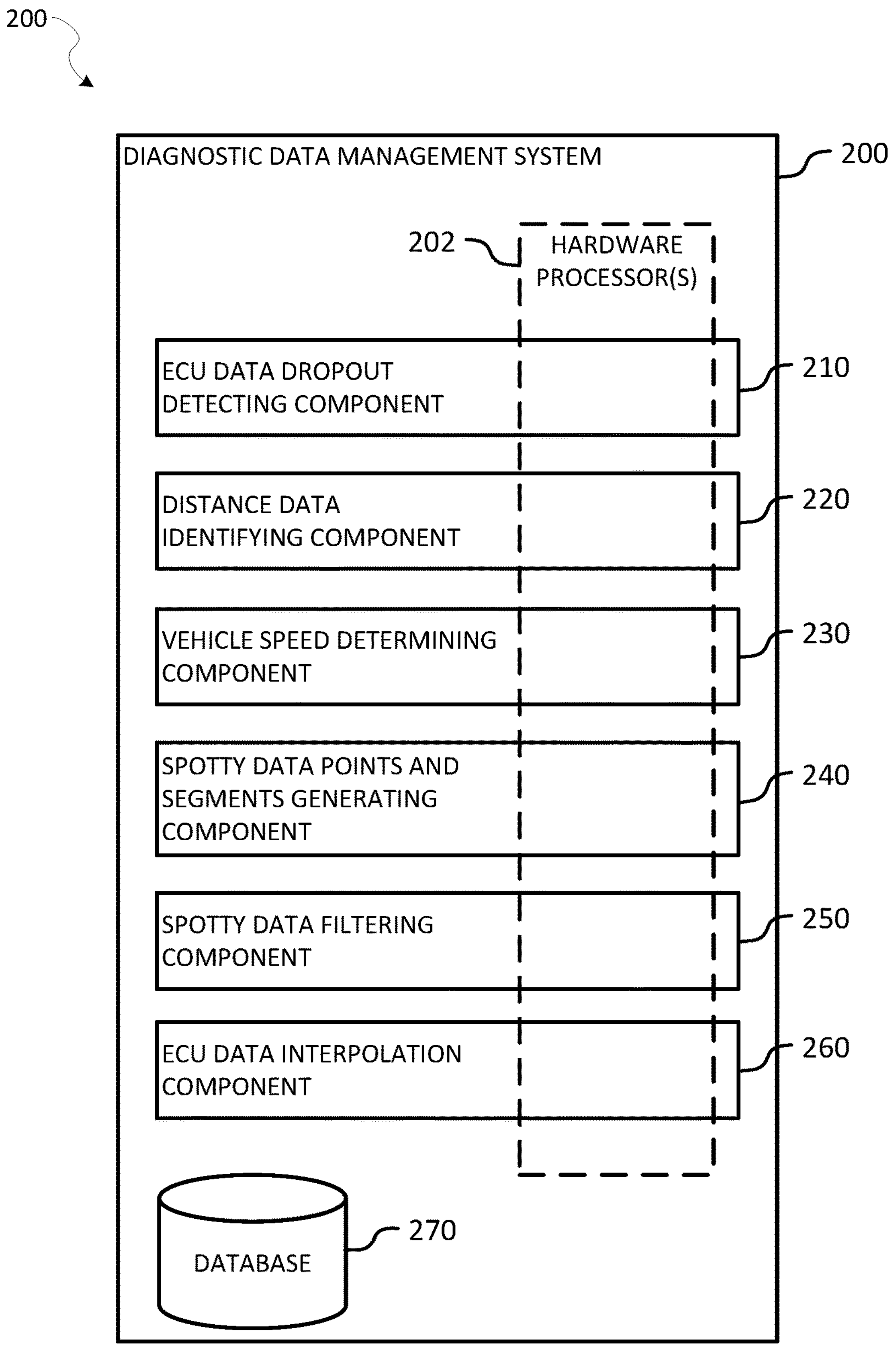
FIG. 2 is a block diagram illustrating an example diagnostic data management system, according to various embodiments of the present disclosure.

FIG. 2 is a block diagram illustrating an example diagnostic data management system 200, according to various embodiments of the present disclosure. For some embodiments, the diagnostic data management system 200 represents an example of the diagnostic data management system 124 described with respect to FIG. 1. As shown, the diagnostic data management system 200 comprises an ECU data dropout detecting component 210, a distance data identifying component 220, a vehicle speed determining component 230, a spotty data points and segments generating component 240, a spotty data filtering component 250, and an ECU data interpolation component 260. According to various embodiments, one or more of the ECU data dropout detecting component 210, the distance data identifying component 220, the vehicle speed determining component 230, the spotty data points and segments generating component 240, the spotty data filtering component 250, and the ECU data interpolation component 260 are implemented by one or more hardware processors 202. Data generated by one or more of the ECU data dropout detecting component 210, the distance data identifying component 220, the vehicle speed determining component 230, the spotty data points and segments generating component 240, the spotty data filtering component 250, and the ECU data interpolation component 260 is stored in a database 270 of the diagnostic data management system 200.

In various embodiments, the ECU data dropout detecting component 210 is configured to detect a lack of ECU data reported by a vehicle in a time period (e.g., an ECU data dropout period)

In various embodiments, the distance data identifying component 220 is configured to identify distance data reported by the vehicle in the time period when ECU data is not being reported. Distance data may be reported or collected via an odometer, or a Global Positioning System (GPS) device communicatively coupled to the vehicle.

In various embodiments, the vehicle speed determining component 230 is configured to determine that the vehicle traveled in the time period at a speed higher than a threshold speed (e.g., 5 mph or 15 mph). The vehicle speed may be calculated based on the distance data, such as odometer data or GPS data. In various embodiments, vehicle speed may be calculated based on distance and time. For example, speed equals distance divided by time (e.g., s=d/t).

In various embodiments, the spotty data points and segments generating component 240 is configured to use a filtering algorithm to generate a spotty data point based on the distance data. The filtering algorithm may be a percentage-based algorithm or a proximity-based algorithm. The diagnostic data management system excludes (or filters out) the distance data from diagnostic data associated with the vehicle. The diagnostic data may be used for various downstream analysis and operations, including fuel efficiency indicator calculation. Gas mileage is an example fuel efficiency indicator. Gas mileage may be measured in MPG. For example, an MPG value of 15 mpg indicates a vehicle travels 15 miles per gallon of gas.

In various embodiments, the spotty data points and segments generating component 240 is further configured to use the filtering algorithm to generate a plurality of spotty data points associated with the vehicle. The plurality of spotty data points includes successive data points within a specified time period. A spotty data point represents an instance of ECU data dropout. The diagnostic data management system may generate one or more spotty data segments based on the plurality of spotty data points. The generation of a spotty data segment may be based on one or more conditions. An example condition may be the percentage of spotty data points, among non-spotty data points, in each spotty data segment is above a threshold percentage (e.g., 70% or 75%). Another example condition may be some additional ECU data being reported.

In various embodiments, the spotty data filtering component 250 is configured to exclude distance data and the associated ECU data (if any) that overlap (or are associated) with the one or more spotty data points or one or more spotty data segments from the diagnostic data of the vehicle. Under this approach, spotty data won't be used to calculate fuel efficiency indicators, such as MPGs. As a result, the risks of miscalculation of fuel efficiency may be largely reduced or completely avoided.

In various embodiments, the ECU data interpolation component 260 is configured to interpolate ECU data to fill in the missing ECU data during the periods of ECU data dropout. Interpolation is the process of using known data values to estimate unknown data values. For example, The diagnostic data management system may generate estimated ECU data based on historical fuel consumption data associated with the vehicle and associate the estimated ECU data with the diagnostic data. The estimated ECU data may be generated further based on vehicle identification data and the distance data reported by the vehicle in the time period. Vehicle identification data may include the make, model, year, engine type, fuel type, vehicle weight, road type, speed, acceleration rates, and other relevant factors of the vehicle. Further, the estimated ECU data may be generated based on similar vehicles that share similar identification data, as described herein.

Figure 3:
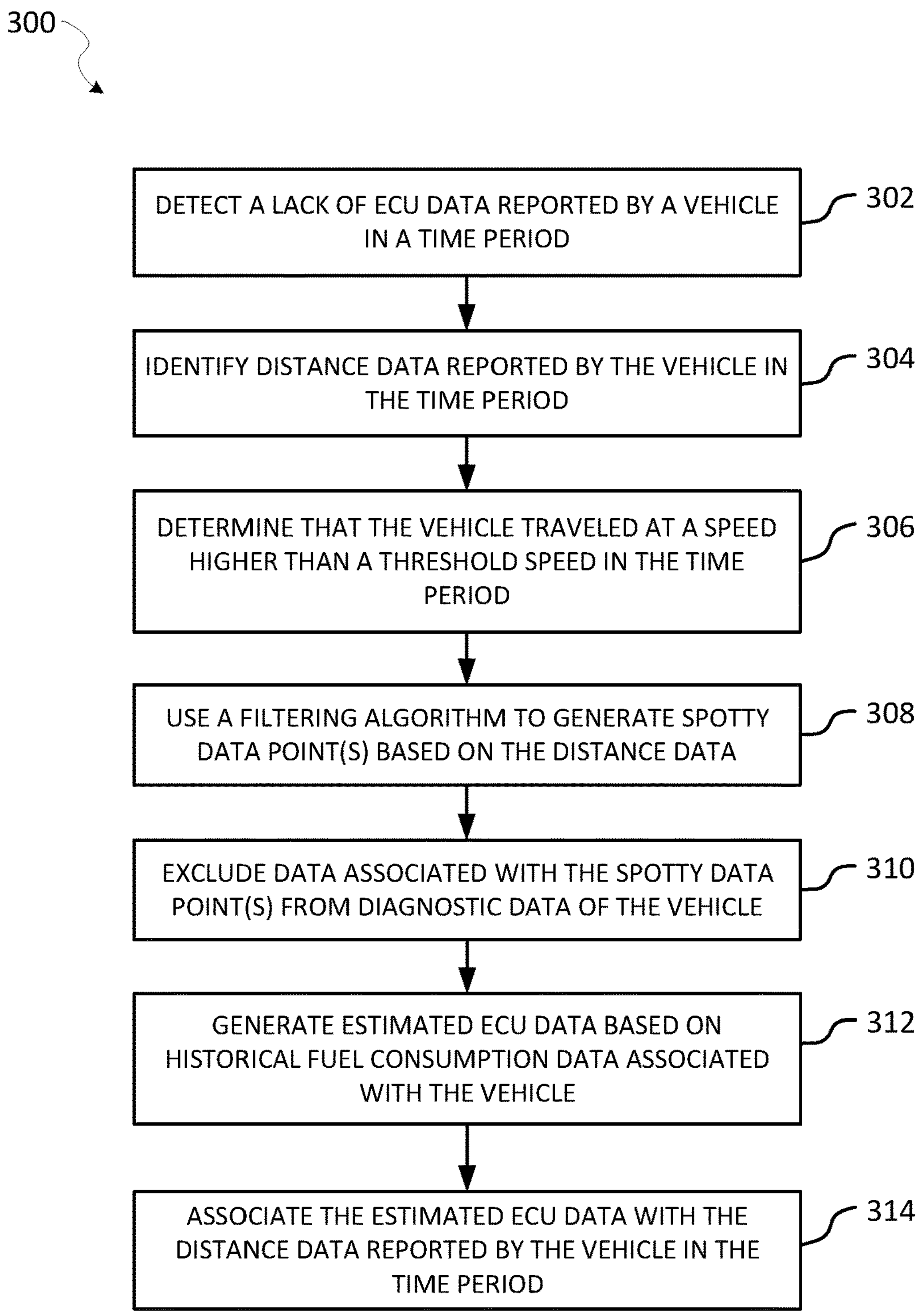
FIG. 3 is a flowchart illustrating an example method for managing diagnostic data, according to various embodiments of the present disclosure.

FIG. 3 is a flowchart illustrating an example method for managing diagnostic data, according to various embodiments of the present disclosure. It will be understood that example methods described herein may be performed by a machine in accordance with some embodiments. For example, the methods 300 can be performed by the diagnostic data management system 124 described with respect to FIG. 1, the diagnostic data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform the method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, a processor detects a lack of ECU data reported by a vehicle in a time period. A person of ordinary skill in the art may appreciate that an engine control unit (ECU) is an electronic control unit that controls a series of actuators on an internal combustion engine to ensure engine performance on a vehicle. ECU reads data from a multitude of sensors within the engine bay, interpreting the data using multidimensional performance maps, and adjusting the engine actuators. In various embodiments, ECU data may include ECU speed data. ECU speed data may be generated by consuming a significant amount of processing power of the onboard CPU of the vehicle. Therefore, ECU speed data may be served as a decent indicator for detecting when there is a diagnostic data dropout. Diagnostic data dropout may be caused by various software issues, including memory and/or CPU overload, or hardware issues associated with the vehicle.

At operation 304, a processor identifies distance data reported by the vehicle in the time period when ECU data is not being reported. Distance data may be reported or collected via an odometer, or a Global Positioning System (GPS) device communicatively coupled to the vehicle.

At operation 306, a processor determines that the vehicle traveled in the time period at a speed higher than a threshold speed (e.g., 5 mph or 15 mph). The vehicle speed may be calculated based on the distance data. In various embodiments, the onboard odometer may be the primary source of distance data. When the odometer is not available, the processor may access GPS data to determine the distance data associated with the vehicle.

At operation 308, a processor uses a filtering algorithm to generate one or more spotty data points based on the distance data. The filtering algorithm may be a percentage-based algorithm or a proximity-based algorithm.

At operation 310, a processor excludes, or filters out, the distance data from diagnostic data associated with the vehicle based on the one or more spotty data points. In various embodiments, a spotty data segment may be generated based on a successive plurality of spotty data points.

In various embodiments, diagnostic data of a vehicle may be used for various downstream analysis and operations, including fuel efficiency indicator calculation. Gas mileage is an example fuel efficiency indicator. Gas mileage may be measured in MPG. For example, an MPG value of 15 mpg indicates a vehicle travels 15 miles per each gallon of gas.

At operation 312, a processor generates estimated ECU data based on historical fuel consumption data associated with the vehicle. The estimated ECU data may be generated further based on vehicle identification data and the distance data reported by the vehicle in the time period. Vehicle identification data may include the make, model, year, engine type, fuel type, vehicle weight, road type, speed, acceleration rates, and other relevant factors of the vehicle. Further, the estimated ECU data may be generated based on similar vehicles that share similar identification data, as described herein.

At operation 314, a processor associates the estimated ECU data with the diagnostic data, filling in the missing ECU data during the ECU data dropout period. As a result, the interpolation method allows the disconnected ECU data points to be connected with the estimated ECU data, so that no distance data needs to be removed from the diagnostic data for an accurate calculation of MPG value.

In various embodiments, the filtering method may be used as an alternative approach to the interpolation method to improve the accuracy of fuel efficiency calculation. In various embodiments, the filtering method and the interpolation method may be used jointly to improve the accuracy of fuel efficiency calculation.

Though not illustrated, the method 300 can include an operation where a graphical user interface for managing diagnostic data can be displayed (or caused to be displayed) by the hardware processor. For instance, the operation can cause a computing device to display the graphical user interface for managing diagnostic data. This operation for displaying the graphical user interface can be separate from operations 302 through 314 or, alternatively, form part of one or more of operations 302 through 314.

Figure 4:
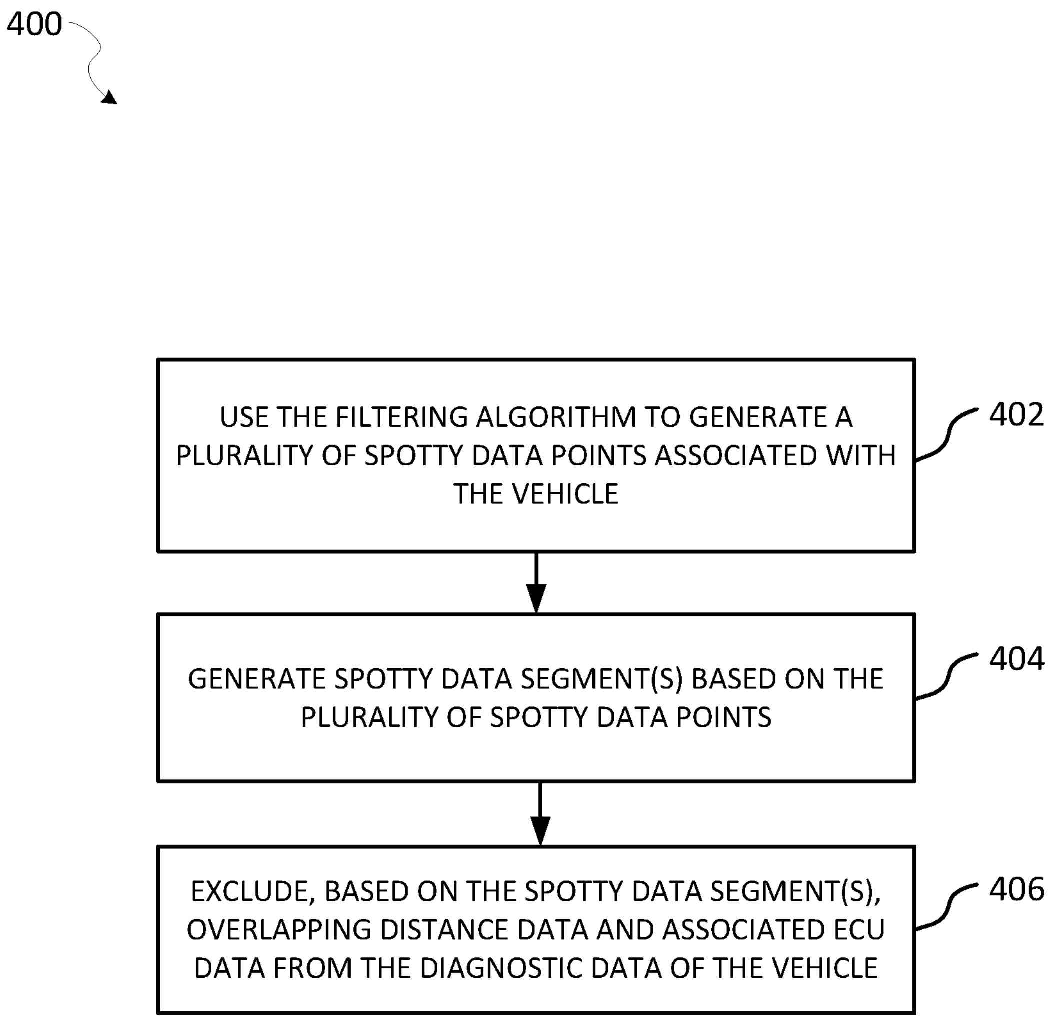
FIG. 4 is a flowchart illustrating an example method for managing diagnostic data, according to various embodiments of the present disclosure.

FIG. 4 is a flowchart illustrating an example method for managing diagnostic data, according to various embodiments of the present disclosure. It will be understood that example methods described herein may be performed by a machine in accordance with some embodiments. For example, the methods 400 can be performed by the diagnostic data management system 124 described with respect to FIG. 1, the diagnostic data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform the method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 404, a processor uses the filtering algorithm to generate a plurality of spotty data points associated with the vehicle. The plurality of spotty data points includes successive data points within a specified time period. Each spotty data point represents an instance of ECU data dropout.

At operation 404, a processor generates one or more spotty data segments based on the plurality of spotty data points. The generation of a spotty data segment may be based on one or more conditions. An example condition may be the percentage of spotty data points, among non-spotty data points. Each spotty data segment is above a threshold percentage (e.g., 70% or 75%). A spotty data segment represents a series of instances of ECU data dropout within a defined time period, such as 10 minutes. Another example condition may be some additional ECU data being reported within the same day as the detected ECU data dropout.

At operation 404, a processor excludes or filters out the distance data and the associated ECU data that overlap with the one or more spotty data segments from the vehicle's diagnostic data.

Though not illustrated, the method 400 can include an operation where a graphical user interface for managing diagnostic data can be displayed (or caused to be displayed) by the hardware processor. For instance, the operation can cause a computing device to display the graphical user interface for managing diagnostic data. This operation for displaying the graphical user interface can be separate from operations 402 through 406 or, alternatively, form part of one or more of operations 402 through 406.

Figure 5:
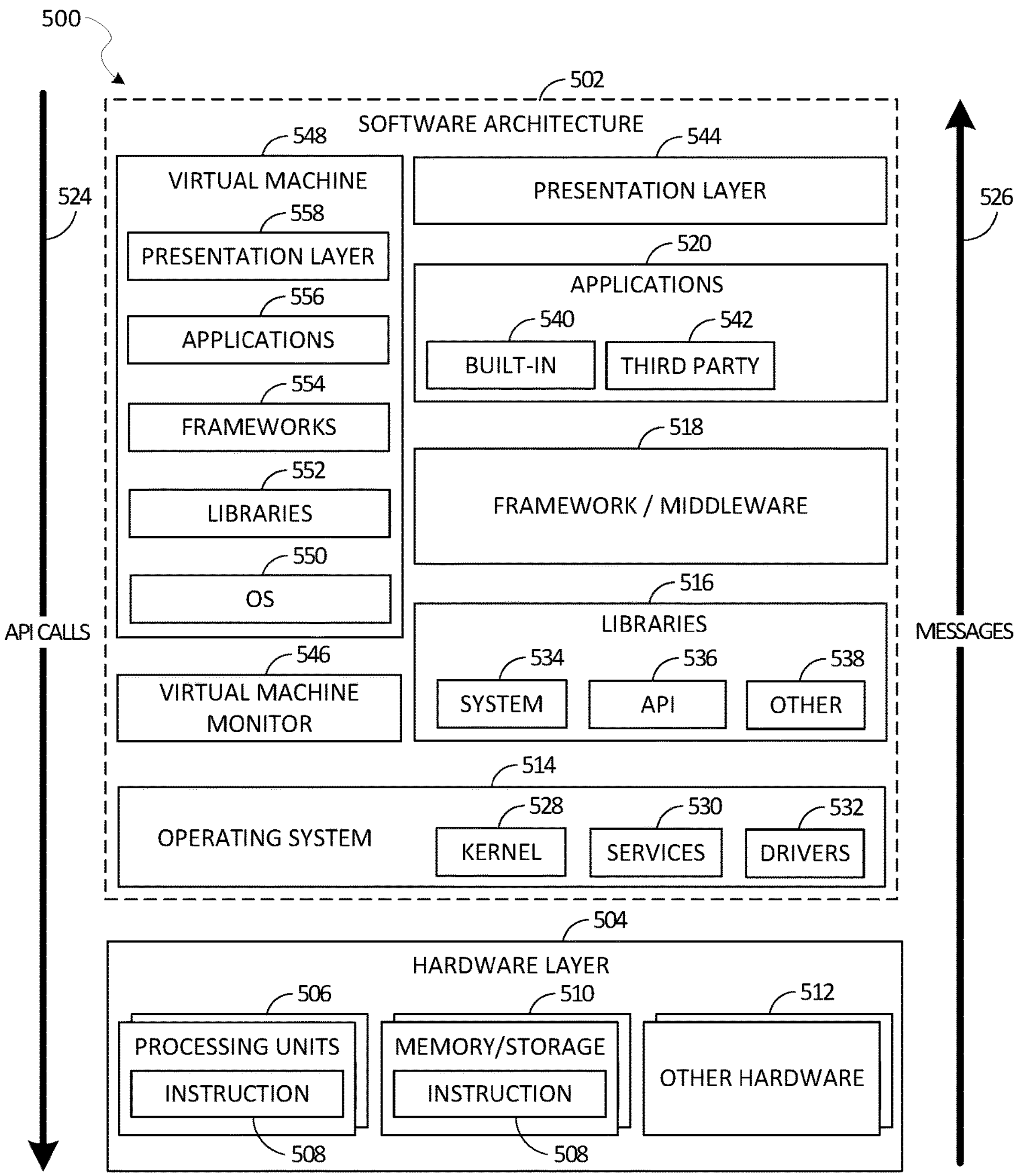
FIG. 5 is a block diagram illustrating a representative software architecture, which may be used in conjunction with various hardware architectures herein described, according to various embodiments of the present disclosure.

FIG. 5 is a block diagram illustrating an example of a software architecture 502 that may be installed on a machine, according to some example embodiments. FIG. 5 is merely a non-limiting example of software architecture, and it will be appreciated that many other architectures may be implemented to facilitate the functionality described herein. The software architecture 502 may be executing on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 comprises one or more processing units 506 having associated executable instructions 508. The executable instructions 508 represent the executable instructions of the software architecture 502. The hardware layer 504 also includes memory or storage modules 510, which also have the executable instructions 508. The hardware layer 504 may also comprise other hardware 512, which represents any other hardware of the hardware layer 504, such as the other hardware illustrated as part of the machine 600.

In the example architecture of FIG. 5, the software architecture 502 may be conceptualized as a stack of layers, where each layer provides particular functionality. For example, the software architecture 502 may include layers such as an operating system 514, libraries 516, frameworks/middleware 518, applications 520, and a presentation layer 544. Operationally, the applications 520 or other components within the layers may invoke API calls 524 through the software stack and receive a response, returned values, and so forth (illustrated as messages 526) in response to the API calls 524. The layers illustrated are representative in nature, and not all software architectures have all layers. For example, some mobile or special-purpose operating systems may not provide a frameworks/middleware 518 layer, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth© drivers, flash memory drivers, serial communication drivers (e.g., Universal Serial Bus (USB) drivers), Wi-Fi© drivers, audio drivers, power management drivers, and so forth depending on the hardware configuration.

The libraries 516 may provide a common infrastructure that may be utilized by the applications 520 and/or other components and/or layers. The libraries 516 typically provide functionality that allows other software modules to perform tasks in an easier fashion than by interfacing directly with the underlying operating system 514 functionality (e.g., kernel 528, services 530, or drivers 532). The libraries 516 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) may provide a higher-level common infrastructure that may be utilized by the applications 520 or other software components/modules. For example, the frameworks 518 may provide various graphical user interface functions, high-level resource management, high-level location services, and so forth. The frameworks 518 may provide a broad spectrum of other APIs that may be utilized by the applications 520 and/or other software components/modules, some of which may be specific to a particular operating system or platform.

The applications 520 include built-in applications 540 and/or third-party applications 542. Examples of representative built-in applications 540 may include, but are not limited to, a home application, a contacts application, a browser application, a book reader application, a location application, a media application, a messaging application, or a game application.

The third-party applications 542 may include any of the built-in applications 540, as well as a broad assortment of other applications. In a specific example, the third-party applications 542 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 542 may invoke the API calls 524 provided by the mobile operating system such as the operating system 514 to facilitate functionality described herein.

The applications 520 may utilize built-in operating system functions (e.g., kernel 528, services 530, or drivers 532), libraries (e.g., system libraries 534, API libraries 536, and other libraries 538), or frameworks/middleware 518 to create user interfaces to interact with users of the system. Alternatively, or additionally, in some systems, interactions with a user may occur through a presentation layer, such as the presentation layer 544. In these systems, the application/module "logic" can be separated from the aspects of the application/module that interact with the user.

Some software architectures utilize virtual machines. In the example of FIG. 5, this is illustrated by a virtual machine 548. The virtual machine 548 creates a software environment where applications/modules can execute as if they were executing on a hardware machine (e.g., the machine 600 of FIG. 6). The virtual machine 548 is hosted by a host operating system (e.g., the operating system 514) and typically, although not always, has a virtual machine monitor 546, which manages the operation of the virtual machine 548 as well as the interface with the host operating system (e.g., the operating system 514). A software architecture executes within the virtual machine 548, such as an operating system 550, libraries 552, frameworks/middleware 554, applications 556, or a presentation layer 558. These layers of software architecture executing within the virtual machine 548 can be the same as corresponding layers previously described or may be different.

Figure 6:
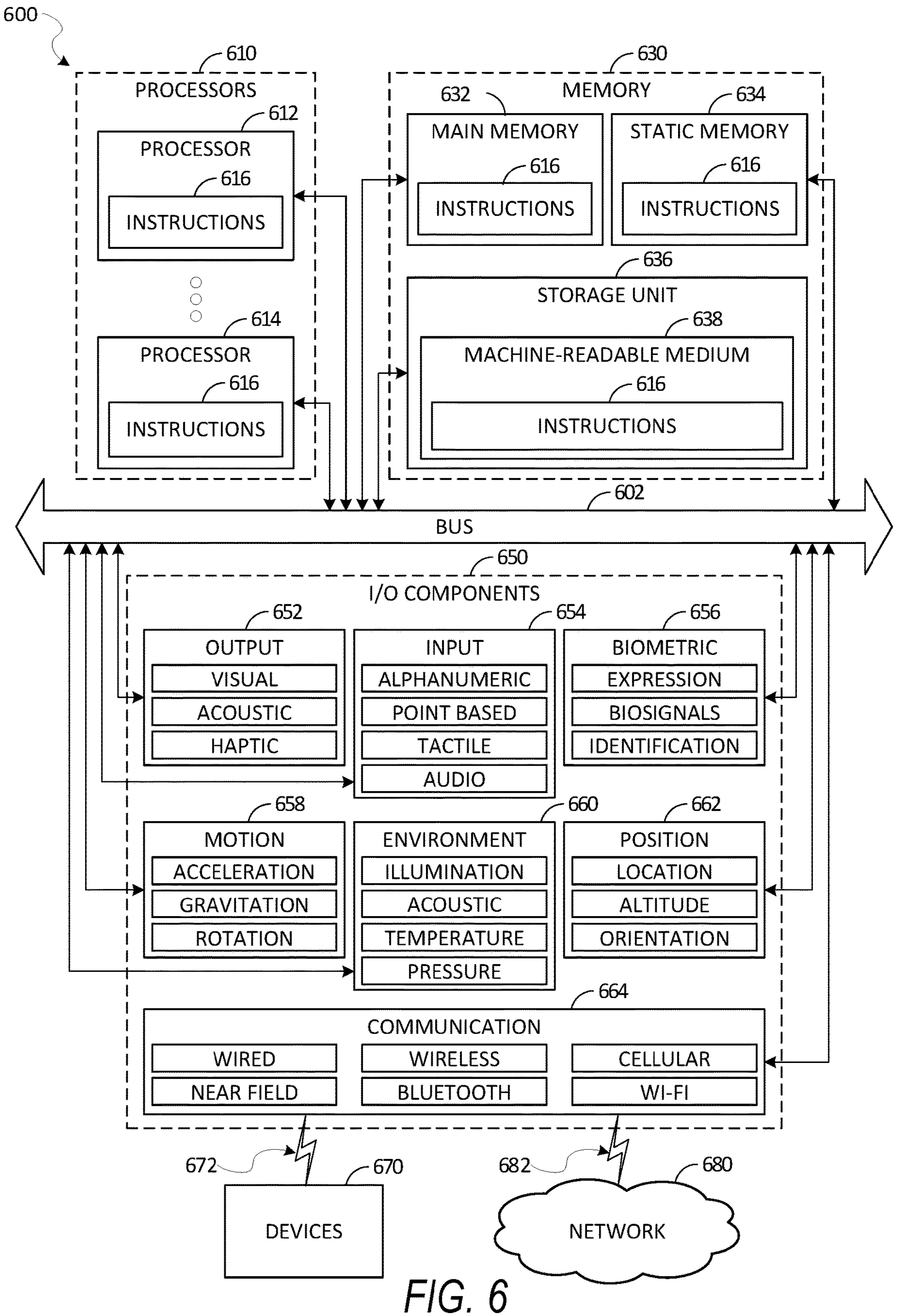
FIG. 6 is a block diagram illustrating components of a machine able to read instructions from a machine storage medium and perform any one or more of the methodologies discussed herein according to various embodiments of the present disclosure.

FIG. 6 illustrates a diagrammatic representation of a machine 600 in the form of a computer system within which a set of instructions may be executed for causing the machine 600 to perform any one or more of the methodologies discussed herein, according to an embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the method 300 described above with respect to FIG. 3 and the method 400 described above with respect to FIG. 4. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an embodiment, the processors 610 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions contemporaneously. Although FIG. 6 shows multiple processors 610, the machine 600 may include a single processor with a single core, a single processor with multiple cores (e.g., a multi-core processor), multiple processors with a single core, multiple processors with multiples cores, or any combination thereof.

The memory 630 may include a main memory 632, a static memory 634, and a storage unit 636 including machine-readable medium 638, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 650 may include biometric components 656, motion components 658, environmental components 660, or position components 662, among a wide array of other components. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth© components (e.g., Bluetooth© Low Energy), Wi-Fi© components, and other communication components to provide communication via other modalities. The devices 670 may be another machine or any of a wide variety of peripheral devices (e.g., a peripheral device coupled via a USB).

Moreover, the communication components 664 may detect identifiers or include components operable to detect identifiers. For example, the communication components 664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A “hardware module” is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase “module” should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, “processor-implemented module” refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a “cloud computing” environment or as a “software as a service” (SaaS). For example, at least some of the operations may be performed by a group of computers (as examples of machines 600 including processors 610), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 600, but deployed across a number of machines 600. In some example embodiments, the processors 610 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 630, 632, 634, and/or the memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 616 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 680 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:

detecting a lack of continuous Engine Control Unit (ECU) data reported by a vehicle in a time period, the ECU data comprising vehicle speed data;

identifying, via an odometer or a Global Positioning System (GPS) device communicatively coupled to the vehicle, distance data reported by the vehicle in the time period;

determining, based on the distance data, that the vehicle traveled at a speed higher than a threshold speed in the time period;

identifying a plurality of spotty vehicle speed data points based on the vehicle speed data and the distance data, the plurality of vehicle speed data points representing an instance of an intermittent ECU data dropout; and automatically replacing a portion of the distance data overlapping with the plurality of spotty vehicle speed data points with estimated ECU data, the estimated ECU data being determined based on identification data of the reporting vehicle and comparable vehicles sharing the identification data.

2. The method of claim 1, wherein the plurality of spotty vehicle speed data points comprises successive data points within the time period, further comprising:

generating one or more spotty data segments based on the plurality of spotty vehicle speed data points.

3. The method of claim 2, further comprising:

excluding, based on the one or more spotty data segments, overlapping distance data and associated ECU data from diagnostic data associated with the vehicle.

4. The method of claim 2, wherein each data segment is generated based on one or more conditions, the one or more conditions corresponding to one or more of a percentage of spotty vehicle speed data points in the each spotty data segment being above a threshold percentage and further ECU data being reported in a same day.

5. The method of claim 2, wherein each spotty data segment corresponds to a predetermined time interval.

6. The method of claim 1, further comprising:

generating estimated ECU data based on historical fuel consumption data associated with the vehicle; and associating the estimated ECU data with the distance data reported by the vehicle in the time period.

7. The method of claim 6, wherein the estimated ECU data is generated further based on vehicle identification data and the distance data reported by the vehicle in the time period.

8. The method of claim 1, further comprising:

generating a Miles Per Gallon (MPG) value based on diagnostic data of the vehicle, the MPG value indicating a degree of fuel efficiency.

9. The method of claim 1, wherein a filtering algorithm used for excluding the portion of the distance data that overlaps with the plurality of spotty vehicle speed data points from diagnostic data associated with the vehicle comprises a percentage-based algorithm or a proximity-based algorithm.

10. The method of claim 1, wherein the identification data of the reporting vehicle comprises at least one of: make, model, year, engine type, fuel type, vehicle weight, road type, or acceleration rates.

11. A system comprising:

a memory storing instructions; and one or more hardware processors communicatively coupled to the memory and configured by the instructions to perform operations comprising:

detecting a lack of continuous Engine Control Unit (ECU) data reported by a vehicle in a time period, the ECU data comprising vehicle speed data;

identifying, via an odometer or a Global Positioning System (GPS) device communicatively coupled to the vehicle, distance data reported by the vehicle in the time period;

determining, based on the distance data, that the vehicle traveled at a speed higher than a threshold speed in the time period;

identifying a plurality of spotty vehicle speed data points based on the vehicle speed data and the distance data, the plurality of vehicle speed data points representing an instance of an intermittent ECU data dropout; and automatically replacing a portion of the distance data overlapping with the plurality of spotty vehicle speed data points with estimated ECU data, the estimated ECU data being determined based on identification data of the reporting vehicle and comparable vehicles sharing the identification data.

12. The system of claim 11, wherein the plurality of spotty vehicle speed data points comprises successive data points within the time period, and wherein the operations further comprise:

generate one or more spotty data segments based on the plurality of spotty vehicle speed data points.

13. The system of claim 12, wherein the operations further comprise:

excluding, based on the one or more spotty data segments, overlapping distance data and associated ECU data from diagnostic data associated with the vehicle.

14. The system of claim 12, wherein each data segment is generated based on one or more conditions, the one or more conditions corresponding to one or more of a percentage of spotty vehicle speed data points in the each spotty data segment being above a threshold percentage and further ECU data being reported in a same day.

15. The system of claim 12, wherein each spotty data segment corresponds to a predetermined time interval.

16. The system of claim 11, wherein the operations further comprise:

generating estimated ECU data based on historical fuel consumption data associated with the vehicle; and associating the estimated ECU data with the distance data reported by the vehicle in the time period.

17. The system of claim 16, wherein the estimated ECU data is generated further based on vehicle identification data and the distance data reported by the vehicle in the time period.

18. The system of claim 11, wherein the operations further comprise:

generating a Miles Per Gallon (MPG) value based on diagnostic data of the vehicle, the MPG value indicating a degree of fuel efficiency.

19. The system of claim 11, wherein a filtering algorithm used for excluding the portion of the distance data that overlaps with the plurality of spotty vehicle speed data points from diagnostic data associated with the vehicle comprises a percentage-based algorithm or a proximity-based algorithm.

20. A non-transitory computer-readable medium comprising instructions that, when executed by a hardware processor of a device, cause the device to perform operations comprising:

detecting a lack of continuous Engine Control Unit (ECU) data reported by a vehicle in a time period, the ECU data comprising vehicle speed data;

identifying, via an odometer or a Global Positioning System (GPS) device communicatively coupled to the vehicle, distance data reported by the vehicle in the time period;

determining, based on the distance data, that the vehicle traveled at a speed higher than a threshold speed in the time period;

identifying a plurality of spotty vehicle speed data points based on the vehicle speed data and the distance data, the plurality of vehicle speed data points representing an instance of an intermittent ECU data dropout; and automatically replacing a portion of the distance data overlapping with the plurality of spotty vehicle speed data points with estimated ECU data, the estimated ECU data being determined based on identification data of the reporting vehicle and comparable vehicles sharing the identification data.

* * * * *